(12) United States Patent
Cazeneuve et al.

(10) Patent No.: US 10,823,868 B2
(45) Date of Patent: Nov. 3, 2020

(54) ESTIMATING DEPTH-DEPENDENT LATERAL TECTONIC STRAIN PROFILES

(71) Applicant: BAKER HUGHES INCORPORATED, Houston, TX (US)

(72) Inventors: Eduardo Cazeneuve, Spring, TX (US); Dee A. Moronkeji, Montgomery, TX (US); Javier A. Franquet, Spring, TX (US); Umesh Prasad, Spring, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 1130 days.

(21) Appl. No.: 14/919,405

(22) Filed: Oct. 21, 2015

(65) Prior Publication Data

US 2017/0115420 A1 Apr. 27, 2017

(51) Int. Cl.
*G01V 1/50* (2006.01)
*G01V 1/28* (2006.01)

(52) U.S. Cl.
CPC ............... *G01V 1/50* (2013.01); *G01V 1/284* (2013.01); *G01V 2210/624* (2013.01); *G01V 2210/6242* (2013.01)

(58) Field of Classification Search
CPC ...... G01V 1/50; G01V 1/284; G01V 2210/47; G01V 2210/624; G01V 2210/6242
See application file for complete search history.

(56) References Cited

U.S. PATENT DOCUMENTS

| | | | |
|---|---|---|---|
| 6,098,021 A | 8/2000 | Tang et al. | |
| 8,047,284 B2 | 11/2011 | Ramurthy et al. | |
| 8,619,500 B2 | 12/2013 | Gray | |
| 8,731,890 B2 | 5/2014 | Fragachan et al. | |
| 8,899,349 B2 | 12/2014 | Rasmus et al. | |
| 9,063,251 B2 | 6/2015 | Moos | |

(Continued)

OTHER PUBLICATIONS

Franquet et al., Orthotropic Horizontal Stress Characterization from Logging and Core-Derived Acoustic Anisotropies, 46th Rock Mechanics/Geomechanics Symposium, Chicago, IL, Jun. 2012 (Year: 2012).*

(Continued)

*Primary Examiner* — Alexander Satanovsky
*Assistant Examiner* — Liam R Casey
(74) *Attorney, Agent, or Firm* — Mossman, Kumar & Tyler PC (57) ABSTRACT

Methods and apparatus for acoustic velocity well logging. Methods may include estimating a property of an earth formation, including estimating a depth-dependent lateral tectonic strain profile for the earth formation by generating a linear-to-linear transformation constrained to map a first value of a shear wave velocity parameter of the formation to an estimated minimum value of lateral tectonic strain in at least one direction corresponding to at least one principal horizontal stress of the formation, and map a second value of the shear wave velocity parameter of the formation to an estimated maximum value of lateral tectonic strain in the at least one direction, wherein the strain values may be estimated using closure pressure. The first value of the shear wave velocity parameter may be a minimum value of shear wave slowness and the second value of the shear wave velocity parameter is a maximum value of shear wave slowness.

18 Claims, 7 Drawing Sheets

(56) References Cited

U.S. PATENT DOCUMENTS

| | | | |
|---|---|---|---|
| 2007/0118292 A1 | 5/2007 | Moos | |
| 2009/0109794 A1* | 4/2009 | Sinha | E21B 49/006 367/35 |
| 2009/0164129 A1 | 6/2009 | Sayers | |
| 2011/0046934 A1* | 2/2011 | Hatchell | G01V 1/30 703/10 |
| 2011/0182144 A1 | 7/2011 | Gray | |
| 2014/0369165 A1 | 12/2014 | Sinha et al. | |
| 2016/0131787 A1* | 5/2016 | Quirein | G01V 5/101 166/250.01 |
| 2016/0291181 A1* | 10/2016 | Sinha | G01V 1/306 |

OTHER PUBLICATIONS

P. Peska et al., "Compressive and Tensile Failure of Inclined Wellbores and Determination of In Situ Stress and Rock Strength," Jnl of Geophysical Research, vol. 100, No. 87, pp. 12792-12811 (Jul. 10, 1995).

F.D. Gray, et al., "Optimize Shale Gas Field Development Using Stresses and Rock Strength Derived From 3D Seismic Data," SPE 137315, Canadian Unconventional Resources & Int'l Petroleum Conference, Calgary, Alberta, Canada (Oct. 19-21, 2010).

T. Ihab et al., "Wireline Straddle Packer Microfrac Testing Enables Tectonic Lateral Strain Calibration in Carbonate Reservoirs," IPTC 17301, Int'l Petroleum Technology Conference, Doha, Qatar (Jan. 20-22, 2014).

D.A. Moronkeji, et al., "Anisotropic Stress Profiling and Tectonic Strain Calibration in a Tight Basement Formation," Rock Mechanics for Natural Resources and Infrastructure, SBMR—ISRM Specialized Conference, Goiania, Brazil (Sep. 9-13, 2014).

E.R. Crain, "Fracture Pressure and Closure Stress," Crain's Petrophysical Handbook, 13 pp., available at: https://www.spec2000.net/10-closurestress.htm (downloaded Jul. 22, 2015).

Int'l Search Report and Written Opinion in PCT/US2016/057946, dated Feb. 8, 2017.

\* cited by examiner

ESTIMATING DEPTH-DEPENDENT LATERAL TECTONIC STRAIN PROFILES

FIELD OF THE DISCLOSURE

The present disclosure is related to the field of acoustic well logging. More specifically, the present disclosure is related to methods of processing receiver signals from an acoustic well logging instrument to estimate certain shear wave propagation properties and stresses of earth formations.

BACKGROUND OF THE ART

In an anisotropic formation, shear waves travel at different velocities with different propagating directions and polarizations. In many cases, an anisotropic rock can be modeled as a transverse isotropic (TI) material. For example, layered structures such as the structure of shale or layered fractures inside a rock can cause such anisotropy, which is sometimes referred to as intrinsic anisotropy. This material has one symmetry axis of infinite-fold rotational symmetry that is perpendicular to the layers. When the rock's symmetry axis is parallel to the borehole axis, there will be no observable shear wave anisotropy from acoustic logging since the shear modes propagating along the axis for this geometry have the same velocity regardless of the direction of polarization. This kind of configuration related to the borehole is sometimes referred to as vertically transverse isotropy (VTI)—rock exhibiting transverse isotropy with a vertical axis of symmetry.

Characterizing in-situ stresses facilitates optimization of further operations conducted in the formation, such as fracturing operations, drilling, or other exploration or completion of a typical oil or gas well.

SUMMARY OF THE DISCLOSURE

Aspects of the present disclosure relate to subterranean evaluation of an earth formation. One general embodiment in accordance with the present disclosure is a method for estimating a property of an earth formation having associated principal horizontal stresses.

Method embodiments may include estimating a property of an earth formation having associated principal horizontal stresses. Methods may include estimating a depth-dependent lateral tectonic strain profile for the earth formation by generating a linear-to-linear transformation constrained to: map a first value of a shear wave velocity parameter of the formation to an estimated minimum value of lateral tectonic strain in at least one direction corresponding to at least one principal horizontal stress of the formation, and map a second value of the shear wave velocity parameter of the formation to an estimated maximum value of lateral tectonic strain in the at least one direction.

The first value of the shear wave velocity parameter may be a minimum value of shear wave slowness and the second value of the shear wave velocity parameter may be a maximum value of shear wave slowness. The linear-to-linear transformation may be constrained to map the minimum value of shear wave slowness to estimated minimum values of lateral tectonic strain in a plurality of directions corresponding to a plurality of principal horizontal stresses of the formation, and map the maximum value of shear wave slowness to estimated maximum values of lateral tectonic strain in the plurality of directions. The transformation may be continuous over a range of shear wave slowness values from the minimum value of shear wave slowness to the maximum value of shear wave slowness.

Methods may include obtaining acoustic measurements at a plurality of depths in a borehole intersecting the earth formation; using the acoustic measurements to estimate the first value and the second value; and estimating the minimum value of lateral tectonic strain and the maximum value of lateral tectonic strain using closure pressure.

Methods may include estimating an intermediate value of lateral tectonic strain corresponding to a selected borehole depth using the depth-dependent lateral tectonic strain profile and an input value of shear wave slowness for the selected borehole depth. Methods may include estimating the minimum value of lateral tectonic strain and the maximum value of lateral tectonic strain. Methods may include estimating a parameter of interest of the earth formation using the depth-dependent lateral tectonic strain profile. Methods may include conducting a further operation in the earth formation using the depth-dependent lateral tectonic strain profile.

Further embodiments may include apparatus for estimating a property of an earth formation having associated principal horizontal stresses. The apparatus may be configured to carry out method embodiments disclosed herein. The apparatus may include a logging tool configured to obtain acoustic measurements indicative of a shear wave velocity parameter of the formation at a plurality of depths in a borehole intersecting the formation; and at least one processor configured to: estimate a first value of a shear wave velocity parameter of the formation at a first depth and a second value of the shear wave velocity parameter at a second depth using the acoustic measurements; estimate a depth-dependent lateral tectonic strain profile for the earth formation by generating a linear-to-linear transformation constrained to: map the first value to an estimated minimum value of lateral tectonic strain in at least one direction corresponding to at least one principal horizontal stress of the formation, and map the second value to an estimated maximum value of lateral tectonic strain in the at least one direction.

Other method embodiments include producing hydrocarbons from an earth formation. Methods may include employing a depth-dependent lateral tectonic strain profile created using the methods herein to perform further operations in the formation; using the depth-dependent lateral tectonic strain profile to estimate at least one principle stress of the formation; and generating the depth-dependent lateral tectonic strain profile.

BRIEF DESCRIPTION OF THE DRAWINGS

For detailed understanding of the present disclosure, reference should be made to the following detailed description of an exemplary embodiment, taken in conjunction with the accompanying drawing and in which.

DETAILED DESCRIPTION OF THE DISCLOSURE

The present disclosure is discussed with reference to specific logging instruments that may form part of a string of several logging instruments for conducting wireline logging operations. It is to be understood that the choice of the specific instruments discussed herein is not to be construed as a limitation and that the method of the present disclosure may also be used with other logging instruments.

Aspects of the present disclosure relate to using measurements taken in a borehole intersecting an earth formation to estimate parameters of interest (e.g., properties of the formation or its constituents), model the formation, and/or predict the behavior of the formation or the wellbore when further operations are conducted on or within it. These measurements may include limited aperture, monopole, dipole, or multipole acoustic measurements.

For example, in exploration and development related to hydrocarbon production, it is important to make accurate measurements of geologic formations. The geologic formations below the surface of the earth may contain reservoirs of oil and gas or underground bodies of water. These geologic formations may include formation layers and various structures.

Existing geological and tectonic effects acting on a formation can impact the design and successful completion of oil and gas and geothermal wells. Under prevailing geomechanical theory, a formation may be characterized by three principal stress directions. The stresses acting along the principal stress axes may be referred to as principal stresses.

For many formations, at operational depths the stress acting vertically on a horizontal plane (defined as the vertical stress, $S_v$) is a principal stress. This requires that the other two principal stresses act in a horizontal direction. Because these horizontal stresses almost always have different magnitudes, they are referred to as the greatest (or maximum) horizontal stress, $S_{Hmax}$, and the least (or minimum) horizontal stress, $S_{Hmin}$. Using conventional techniques well-known in the field, horizontal stress magnitude profiles can be estimated from rock stiffness tensor, Biot's poroelastic parameter, pore pressure, overburden stress, and lateral tectonic strains in isotropic or anisotropic rocks. In many fields of endeavor, it may be useful to characterize stresses on the formation or related parameters.

Detailed knowledge of geological formation stresses is desirable in the hydrocarbon production business, because formation stresses can affect the planning of drilling, fracturing, and other operations. Techniques to characterize these stresses allow for mitigation or utilization of their effects.

Conventional analysis and prediction of stress profiles employs an implicit assumption that tectonic strain values remain constant within the formation. Because the lateral tectonic strain may vary with depth, however, this is an approximation which can have drastic effects on the accuracy of the overall profile estimation. Techniques for accurately estimating a depth-dependent lateral strain would therefore be desirable.

General embodiments are directed to estimating a depth-dependent lateral tectonic strain profile for the earth formation using a transformation mapping shear wave values to values for lateral tectonic strain. The transformation may be generated by constraining a linear-to-linear transformation to map a minimum value of shear wave slowness of the formation to an estimated minimum value of lateral tectonic strain in at least one direction corresponding to at least one principal horizontal stress of the formation, and map a maximum value of shear wave slowness of the formation to an estimated maximum value of lateral tectonic strain in the at least one direction.

Further method embodiments may include using the depth-dependent lateral tectonic strain profile as generated above to estimate an intermediate value of lateral tectonic strain for a selected borehole depth. This intermediate value may then be used to estimate a parameter of interest of the earth formation (such as, for example, principal stresses) using the intermediate value. Further operations in the earth formation may also be conducted using the intermediate value or the depth-dependent lateral tectonic strain profile itself.

Figure 1A:
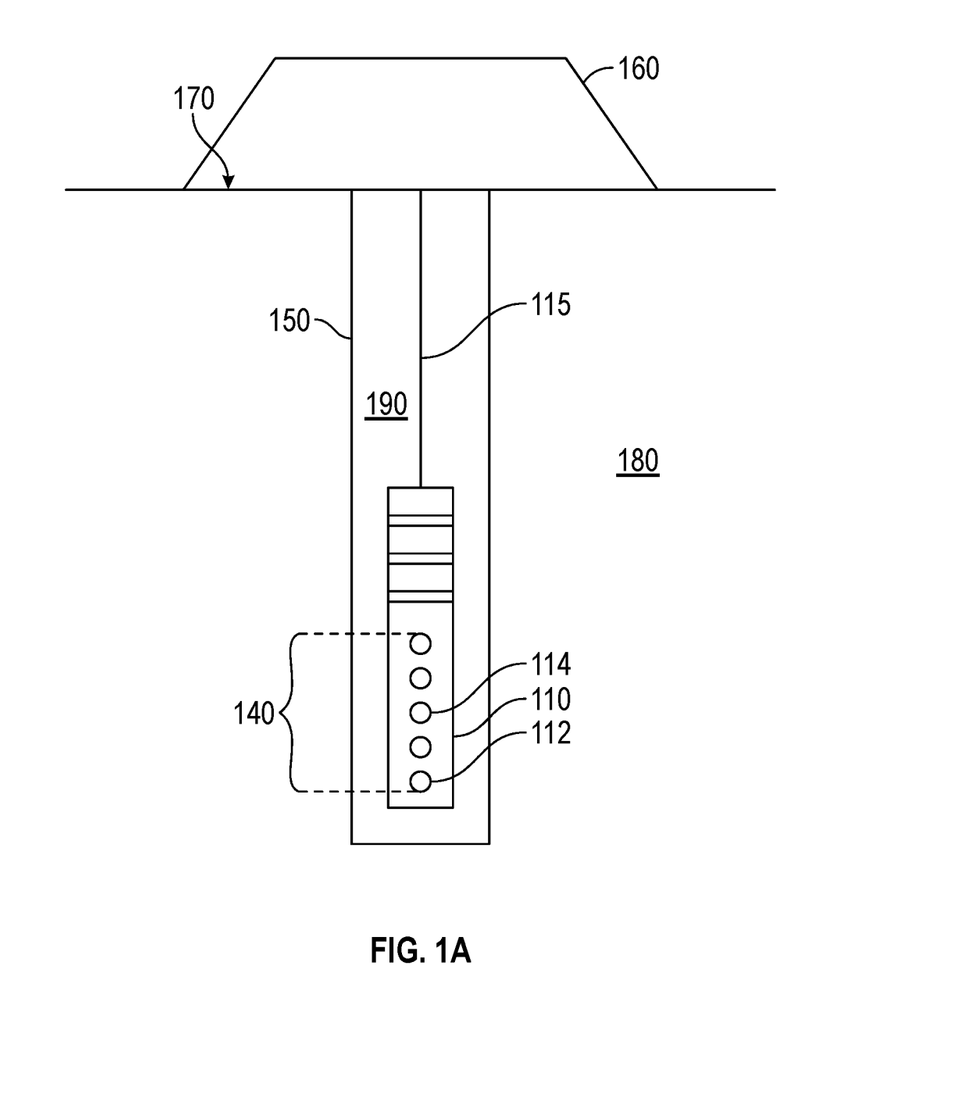
FIG. 1A schematically illustrates an acoustic logging system in accordance with embodiments of the present disclosure.

FIG. 1A schematically illustrates an acoustic logging system 100 having a downhole tool 110 configured to acquire information for characterizing an earth formation 180. The downhole tool 110 may include acoustic sensors 140 including one or more acoustic transmitters and one or more acoustic receivers.

The system 100 may include a conventional derrick 160 erected on a derrick floor 170. A conveyance device (carrier 115) which may be rigid or non-rigid, may be configured to convey the downhole tool 110 into wellbore 150 in proximity to formation 180. The carrier 115 may be a drill string, coiled tubing, a slickline, an e-line, a wireline, etc. Thus, depending on the configuration, the tool 110 may be used during drilling and/or after the wellbore 150 has been formed. While a land system is shown, the teachings of the present disclosure may also be utilized in offshore or subsea applications.

Downhole tool 110 may be coupled or combined with additional tools e.g., some or all the information processing system (inset). The carrier 115 may include embedded conductors for power and/or data for providing signal and/or power communication between the surface and downhole equipment (e.g., a seven conductor cable).

The carrier 115 may include a bottom hole assembly (BHA), which may include a drilling motor for rotating a drill bit. Borehole fluid (e.g., downhole fluid, or drilling fluid) 190 may be present between the formation 180 and the downhole tool 110. System 100 also includes one or more acoustic transmitters 112 and acoustic receivers 114 associated with (e.g. disposed on) the tool 110. Transmitters 112 may include, but are not limited to, dipole sources, monopole sources, ultrasonic horns, electromagnetic acoustic transducers ('EMAT's), limited aperture transducers, and sources coupled to the borehole wall, and so on.

The transmitters 112 may periodically emit acoustic energy pulses. For a tool-mounted transmitter, the pulses typically travel radially outward from the transmitter 112 through a downhole fluid 104 in the borehole 150 until they strike the wall of the borehole 150. The pulses may then travel along the wall of the borehole 150.

Some of the acoustic energy returns to the fluid 104 and can be detected by a plurality of receivers 114 that may be disposed axially on the tool. In some configurations, the receivers 114 may be spaced apart from the transmitter(s) 112. In some embodiments, the receivers 114 may include dipole receivers. In some embodiments, there may be as few as one transmitter 112 and as few as one receiver 114. The use of various numbers, types, and configurations of receivers is known.

The receivers 114 may generate electrical signals corresponding to the amplitude of the acoustic energy reaching the receivers 114. The transmitters and receivers may include circuitry (e.g., signal processing electronics) for translating between digital and analog signals, filtering signals, increasing signal-to-noise ratio, and other signal processing techniques, or this circuitry may be implemented elsewhere in the tool or at the surface. This circuitry may include one or more processors, such as, for example, a digital signal processor ('DSP').

A control unit (or controller) may operate the transmitters 112 and receivers 114 to take measurements downhole in a manner well-understood in the art. At least one processor, which may also implement the control unit, may process signal information generated from these measurements in accordance with method embodiments disclosed herein. The at least one processor may record, transmit, or display (e.g., render on a computer monitor) the information or parameters of interest or models generated using the information. The at least one processor may be implemented at (or may further communicate with further processors at) suitable locations downhole (e.g., on the tool or carrier) at the surface, or remotely. The processor may process data relating to the operations and data from the sensors, and may control one or more downhole operations performed by system. The control unit may be a computer-based unit that may be implemented as a hardware environment, as discussed below.

A point of novelty of the system illustrated in FIG. 1A is that the control unit is configured to perform certain methods (discussed below) that are not in the prior art. A surface control unit or downhole control unit may be configured to control sensors described above and to estimate a parameter of interest according to methods described herein. Control of these components may be carried out using one or more models using methods described below.

Figure 1B:
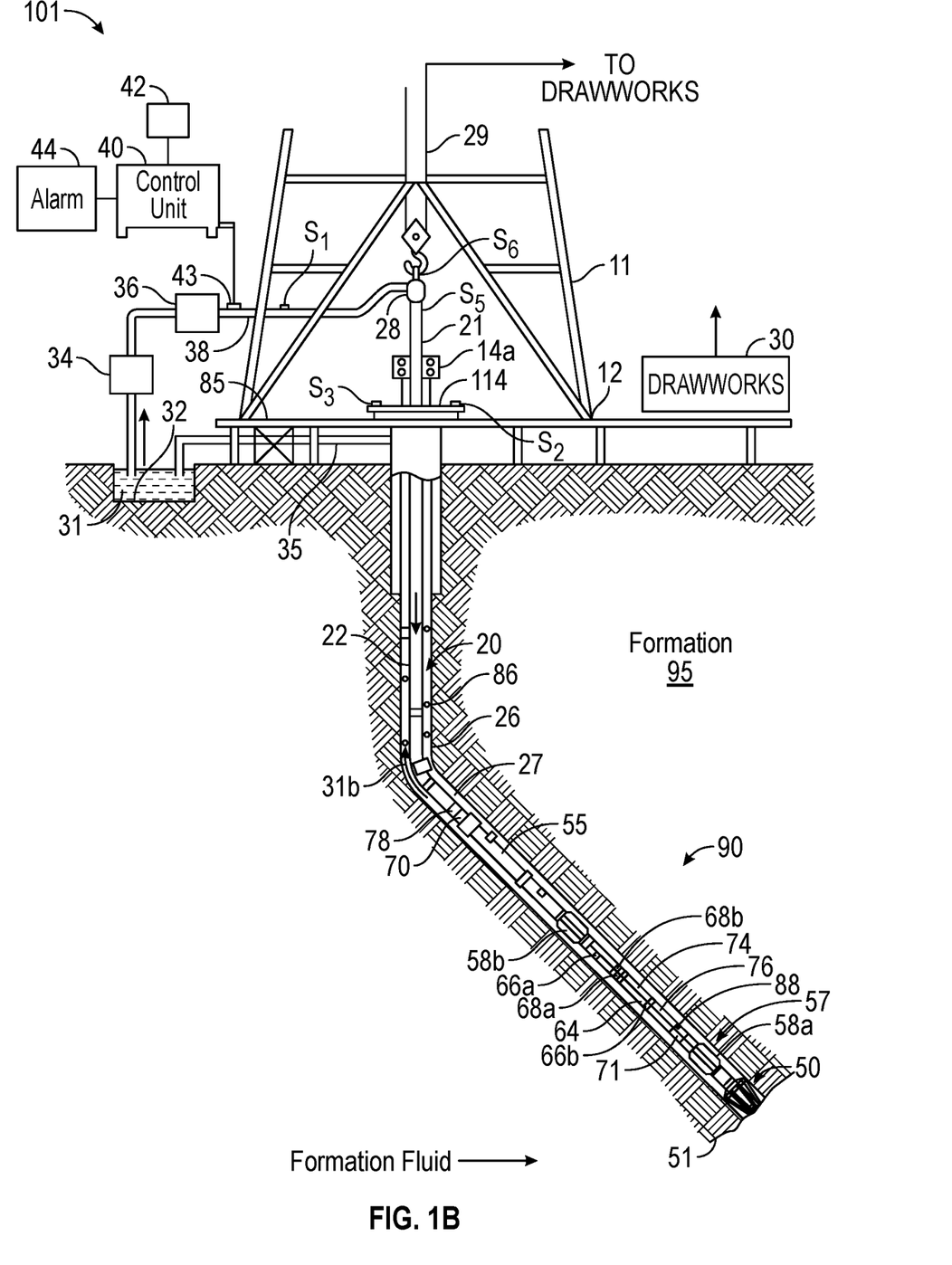
FIG. 1B shows a schematic diagram of exemplary drilling system in accordance with embodiments of the present disclosure.

FIG. 1B shows a schematic diagram of exemplary drilling system 101 having a bottom hole assembly (BHA) or drilling assembly 90 that includes sensors for downhole wellbore condition and location measurements. The BHA 90 is conveyed in a borehole 26. The drilling system 10 may include a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations 95 when it is rotated to drill the borehole 26. The drill string 20 may be coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used instead of the rotary table 14 to inject the BHA into the wellbore 26 when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid may pass from the mud pump 34 into the drill string 20 via a desurger 36 and the fluid line 38. The drilling fluid 31 discharges at the borehole bottom 51 through openings in the drill bit 50. The drilling fluid 31 circulates uphole through the annular space 27 between the drill string 20 and the borehole 26 and returns to the mud pit 32 via a return line 35 and drill-cutting screen 85 that removes the drill cuttings 86 from the returning drilling fluid 31b. A sensor S1 in line 38 provides information about the fluid flow rate. A surface torque sensor S2 and a sensor S3 associated with the drill string 20 respectively provide information about the torque and the rotational speed of the drill string 20. Tubing injection speed is determined from the sensor S5, while the sensor S6 provides the hook load of the drill string 20.

In some applications only rotating the drill pipe 22 rotates the drill bit 50. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied WOB. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors S1, S6, and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 may include a computer, memory for storing data, recorder for recording data and other peripherals. The surface control unit 40 may also includes a simulation model and processes data according to programmed instructions. The control unit 40 may be adapted to activate alarms 44 when certain unsafe or undesirable operating conditions occur.

The BHA 90 may also include formation evaluation sensors or devices for determining resistivity, density and porosity of the formations surrounding the BHA. A gamma ray device for measuring the gamma ray intensity and other nuclear and non-nuclear devices used as measurement-while-drilling devices are suitably included in the BHA 90. As an example, FIG. 1B shows an example resistivity-measuring device 64 in BHA 90. It provides signals from which resistivity of the formation near or in front of the drill bit 50 may be determined. The resistivity device 64 has transmitting antennae 66a and 66b spaced from the receiving antennae 68a and 68b. In operation, the transmitted electromagnetic waves are perturbed as they propagate through the formation surrounding the resistivity device 64.

The receiving antennae 68*a* and 68*b* detect the perturbed waves. Formation resistivity may be derived from the phase and amplitude of the detected signals. The detected signals may be processed by a downhole computer 70 to determine the resistivity and dielectric values.

An inclinometer 74 and a gamma ray device 76 may be suitably placed along the resistivity-measuring device 64 for respectively determining the inclination of the portion of the drill string near the drill bit 50 and the formation gamma ray intensity. Any suitable inclinometer and gamma ray device, however, may be utilized for the purposes of this present disclosure. In addition, position sensors (not shown), such as accelerometers, magnetometers or gyroscopic devices may be disposed in the BHA 90 to determine the drill string azimuth, true coordinates and direction in the wellbore 26. Such devices are known in the art and are not described in detail herein.

In the above-described configuration, the mud motor 55 transfers power to the drill bit 50 via one or more hollow shafts 58*b* that run through the resistivity-measuring device 64. The hollow shaft 58*b* enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation porosity, permeability and density (collectively designated by numeral 78) are preferably placed above the mud motor 55. The BHA 90 may also include one or more seismic receivers (collectively represented herein by numeral 88) at a suitable location in the BHA 90. Such devices 78 and 88 are known in the art and are thus not described in any detail.

As noted earlier, a significant portion of the current drilling systems, especially for drilling highly deviated and horizontal wellbores, utilize coiled-tubing for conveying the drilling assembly downhole. In such application, a thruster 71 may be deployed in the BHA 90 to provide the required force on the drill bit 50. For the purpose of this present disclosure, the term weight on bit ("WOB") is used to denote the force on the bit applied to the drill bit during the drilling operation, whether applied by adjusting the weight of the drill string or by thrusters. Also, when coiled-tubing is utilized a rotary table 14 does not rotate the tubing; instead it is injected into the wellbore 26 by a suitable injector 14*a* while the downhole motor 55 rotates the drill bit 50.

Figure 2:
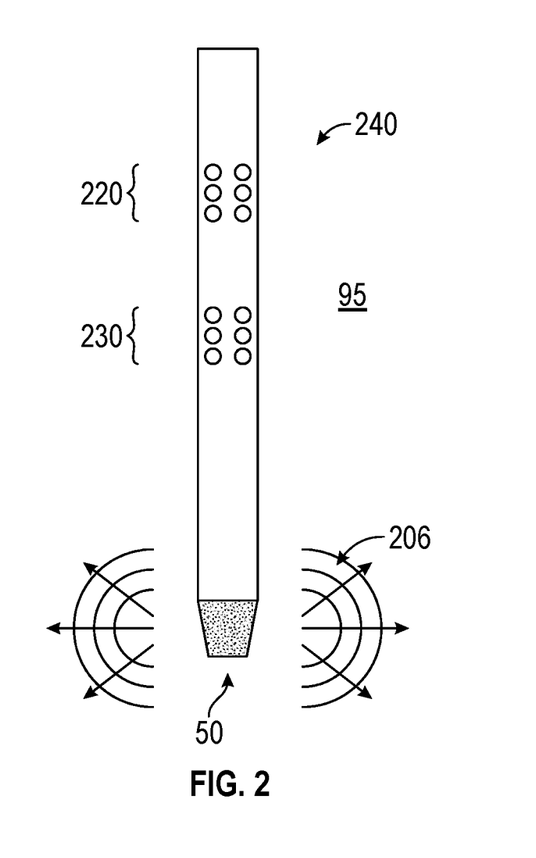
FIG. 2 is a schematic view of an exemplary acoustic logging while drilling tool system in accordance with embodiments of the present disclosure.

FIG. 2 is a schematic view of an exemplary acoustic logging while drilling tool system on a drill collar 240, which may be part of BHA 90. The drill collar 90 may include a drill bit 50. This system is mounted on the drill collar 240 for performing acoustic measurements while the formation is being drilled. The acoustic logging while drilling tool system may use drill bit 50 as a source to emit acoustic vibrations 206 that may traverse formation 95 and may also be propagated along the borehole wall and be received by sensors 220 and 230 which may be in arrays. These sensors are discussed later in the application. As discussed below, the drill bit 50 generates what is generally regarded as noise in a variety of modes such as monopole, dipole, quadrupole and higher order modes. The drill collar may be configured to eliminate propagation of multipole components through the collars, such as for example, by using isolators, by rotating in frequency band free of collar mode, and so on.

As with FIG. 1A, a point of novelty of the system illustrated in FIG. 1B is that the control unit is configured to perform certain methods (discussed below) that are not in the prior art. A surface control unit or downhole control unit may be configured to control sensors described above and to estimate a parameter of interest according to methods described herein. Control of these components may be carried out using one or more models using methods described below.

Figure 3:
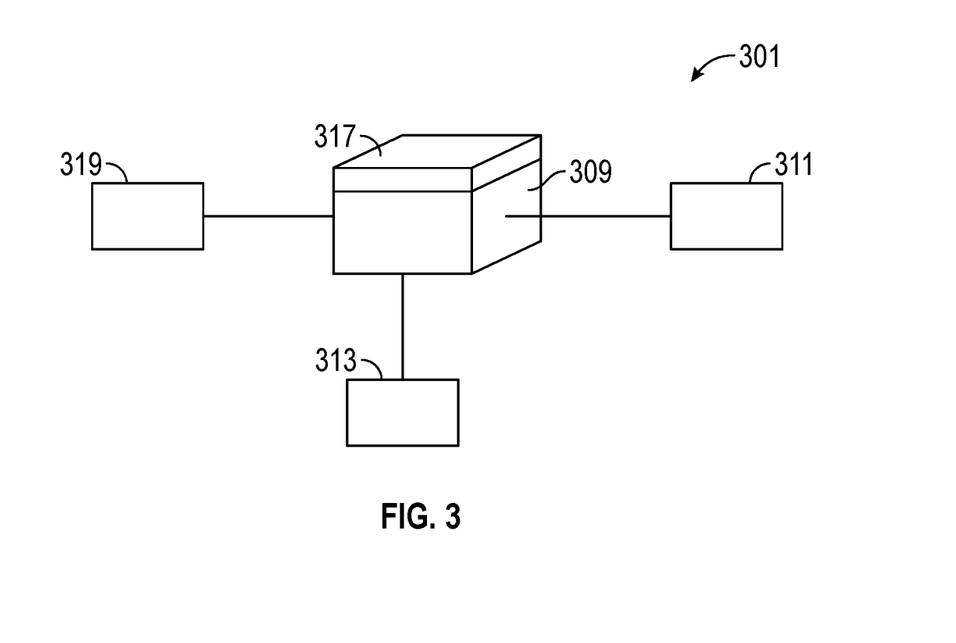
FIG. 3 illustrates a hardware environment in accordance with embodiments of the present disclosure.

FIG. 3 illustrates a hardware environment in accordance with embodiments of the present disclosure. Certain embodiments of the present disclosure may be implemented with a hardware environment 301 that includes an information processor 309, an information storage medium 311, an input device 313, processor memory 317, and may include peripheral information storage medium 319. The hardware environment may be at the surface, in the wellbore, in the tool 110, at the rig, or at a remote location. Moreover, the several components of the hardware environment may be distributed among those locations. The input device 313 may be any information reader or user input device, such as data card reader, keyboard, USB port, etc. The information storage medium 311 stores information provided by sensors on tool 110. Information storage medium 311 may be any non-transitory computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 311 stores a program that when executed causes information processor 309 to execute the disclosed method. Information storage medium 311 may also store formation information, or the formation information may be stored in a peripheral information storage medium 311, which may be any standard computer information storage device, such as a USB drive, memory stick, hard disk, removable RAM, network based storage or other commonly used memory storage system known to one of ordinary skill in the art including Internet based storage.

Hardware environment may be any form of computer or mathematical processing hardware, including Internet based hardware. When the program is loaded from information storage medium 311 into processor memory 317 (e.g. computer RAM), the program, when executed, causes information processing device 311 to retrieve signal information from galvanic TEM measurements from either information storage medium 311 or peripheral information storage medium 319 and process the information to estimate a parameter of interest.

In various implementations the control unit may be implemented as at least one processor in the tool, elsewhere in the carrier, at the surface, or remotely. The same or related processor may also be used to estimate horizontal stress profiles in accordance with the present disclosure.

Estimating a horizontal stress profile may be initiated by generating a borehole acoustic log from acoustic measurements in the borehole (e.g., a vertical borehole) at various depths. Information embodied in these measurements relate to the stress profiles of the formation.

This acoustic information may be processed to estimate compressional (DTC) and shear (DTS) wave velocities using full monopole and/or dipole waveform data. Rock anisotropy may be estimated for hydraulic fracturing purposes, for example, by using cross-dipole shear and Stoneley-derived horizontal shear (DTSH) measurements. Acoustic anisotropy measurements in a rock exhibiting transverse isotropy with a vertical axis of symmetry (VTI) show that the shear wave velocity anisotropy is more pronounced than the compressional wave velocity anisotropy.

For anisotropic stress modeling, vertical transversely isotropic (VTI) formations may be fully described by five independent elastic stiffnesses: $C_{11}$, $C_{13}$, $C_{33}$, $C_{44}$, $C_{66}$. For vertical transversely isotropic (VTI) formations, estimation of these stiffnesses may be carried out using three independent borehole acoustic measurements (e.g., compressional (DTC), shear (DTS), and Stoneley-derived horizontal shear (DTSH) measurements) in conjunction with the ANNIE approximation, as shown below.

As an optional first step, estimates may be improved by converting rock stiffness from dynamic to static by using Lacy's empirical correlation for Young's modulus and applying a 5-8 percent reduction for Poisson's ratio. Estimating dynamic elastic properties without calibrating can lead to underestimating the values of the lateral tectonic strains in order to reproduce the magnitude of in-situ stresses measured.

Because the VTI model considers the formation to be transversely isotropic with respect to the vertical axis, the transverse shear wave anisotropy may be estimated from the Stoneley wave.

The ANNIE approximation assumes the non-diagonal stiffness terms $C_{12}$ and $C_{13}$ are equal and Delta ($\delta$), the Thomsen coefficient, is equal to zero.

$$\delta = \frac{(C_{13}+C_{44})\wedge 2 - (C_{33}-C_{44})\wedge 2}{2C_{33}(C_{33}-C_{44})}$$

$$C_{12} = C_{13}$$

$$C_{13} = C_{33} - 2C_{44}$$

Where $$C_{33} = \rho\left(\frac{1}{DTC}\right)^2$$

$$C_{44} = \rho\left(\frac{1}{DTS}\right)^2$$

$$C_{66} = \rho\left(\frac{1}{DTSH}\right)^2$$

And thus, $$C_{11} = C_{33} - 2C_{44} + 2C_{66}$$

It may be assumed that $DTS_{vertical}$ is identical in any azimuthal direction (e.g., $C_{44}=C_{55}$). DTC, $DTS_{vertical}$, and DTSH are used with density, true value depth (TVD), total vertical stress, pore pressure, and poroelasticity effects (e.g., Biot's poroelastic coefficient) to solve the rock constitutive model using methods known in the art.

The total vertical stress may be obtained by integrating a bulk density log up to the surface; the pore pressure may be estimated from an acoustic log and calibrated with reservoir pressure testing.

The horizontal stress profile may then be estimated from the static stiffness tensor, overburden stress, pore pressure, and poroelasticity with some assumption of the lateral tectonic strain (e.g., lateral strains in the directions of effective greatest horizontal stress $\sigma_{Hmax}$ and effective least horizontal stress and $\sigma_{Hmin}$.) as shown below.

$$\sigma_{h,min} = \frac{C_{13}}{C_{33}}(\sigma_v - \alpha_z P_p) + \alpha_x P_p + \left(C_{11} - \frac{C_{13}^2}{C_{33}}\right)\varepsilon_h + \left(C_{12} - \frac{C_{13}^2}{C_{33}}\right)\varepsilon_H$$

-continued $$\sigma_{H,max} = \frac{C_{13}}{C_{33}}(\sigma_v - \alpha_z P_p) + \alpha_y P_p + \left(C_{11} - \frac{C_{13}^2}{C_{33}}\right)\varepsilon_H + \left(C_{12} - \frac{C_{13}^2}{C_{33}}\right)\varepsilon_h$$

Depth Dependent Lateral Strain Model

Techniques disclosed herein relate to generating and incorporating a variable (non-constant), depth dependent tectonic lateral strain model. This model accounts for variation in the fracture gradient with depth as a result of tectonic forces. Lateral strain changes with depth, because deeper formations experience greater tectonic history than do more shallow formations.

Shear (S, secondary) waves are transverse waves that are transmitted by lateral displacement of particles in a rigid elastic formation. The particle motion in a shear wave is perpendicular to the direction of motion. Because of the way shear waves are transmitted, in vertically transverse isotropic (VTI) formations, the profile of predictive lateral tectonic strain is similar to the profile of the shear wave slowness.

In accordance with the techniques shown herein, shear wave velocity parameters, such as, for example, shear wave slowness, may therefore be mapped to lateral tectonic strain values along the principal directions using appropriate minimums and maximums.

Figure 4:
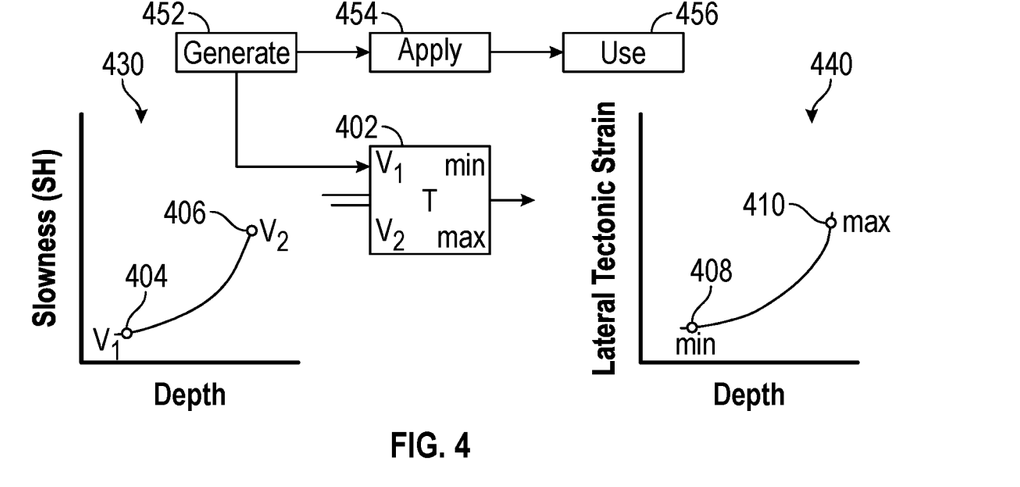
FIG. 4 illustrates techniques in accordance with embodiments of the disclosure for generating a depth dependent lateral strain profile from a depth dependent slowness log.

FIG. 4 illustrates techniques in accordance with embodiments of the disclosure for generating a depth dependent lateral strain profile 440 from a depth dependent slowness log 430. Referring to FIG. 4, a depth-dependent lateral tectonic strain profile for the earth formation may be estimated by generating (step 452) a linear-to-linear transformation 402 constrained to map a first value 404 of a shear wave velocity parameter of the formation to an estimated minimum value 408 of lateral tectonic strain in at least one direction corresponding to at least one principal horizontal stress of the formation, and map a second value 406 of the shear wave velocity parameter of the formation to an estimated maximum value 410 of lateral tectonic strain in the at least one direction. The minimum lateral tectonic value in the minimum horizontal stress direction (strain) may be matched to minimum value (lower bound) of stress measurement (EL2). The maximum lateral tectonic value in the minimum horizontal stress direction (strain) may be matched to maximum value (upper bound) of stress measurement (ER2).

The transformation may be generated according to the linear equation:

Linear equation=$a$*DTS+$b$ $a$=(EL2−ER2)/(EL1−ER1)

$b$=((EL1*ER2)−(ER1*EL2))/(EL1−ER1)

LTX=$a$*DTS+$b$, wherein LTX is the lateral tectonic strain curve in the direction of the minimum horizontal stress (LTX), x-direction.

To provide the lateral tectonic strain curve in the direction of the maximum horizontal stress (LTY) (y-direction), the minimum lateral tectonic value in the maximum horizontal stress direction (strain) may be matched to the minimum value (lower bound) of stress measurement (EL2); and the maximum lateral tectonic value in the maximum horizontal stress direction (strain) may be matched to maximum (upper bound) value of stress measurement (ER2). The same linear equation is used as above.

The first value 404 may be a minimum value of shear wave slowness of the formation, and the second value 406 may be a maximum value of shear wave slowness of the formation, taken from minimum (EL1) and maximum (ER1) values of the DTS curve. Once generated, the transformation 402 may be applied to the slowness log 430 (step 454) to generate the depth-dependent lateral tectonic strain profile 440. Method embodiments may include using (step 456) the depth-dependent lateral tectonic strain profile 440 to estimate values of lateral tectonic strain for selected borehole depths. These value may in turn be used to estimate a parameter of interest of the earth formation (such as, for example, principal stresses).

Figure 5:
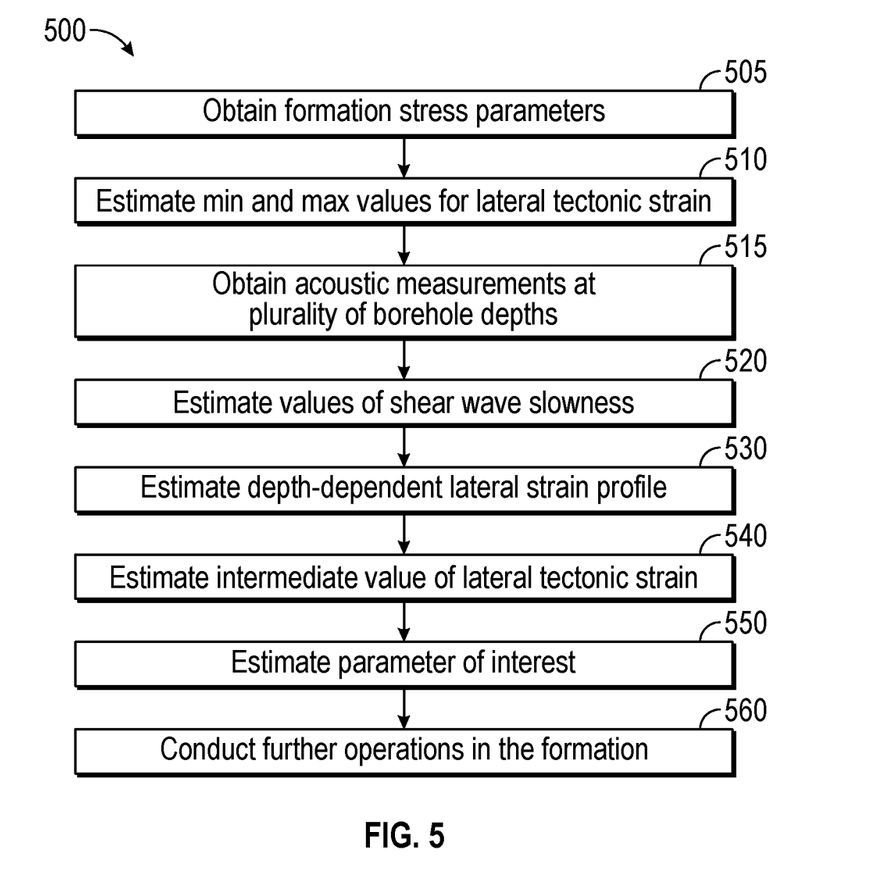
FIG. 5 illustrates methods for estimating properties of an earth formation in accordance with embodiments of the present disclosure.

FIG. 5 illustrates methods for estimating properties of an earth formation in accordance with embodiments of the present disclosure. The method 500 may begin with optional step 505. Step 505 comprises obtaining formation stress parameters. Estimating the magnitude of the vertical (overburden) stress may be carried out by computing the weight of overlying rocks and fluids (e.g., by integration of the overburden density of the overlying rock, which may be accomplished by integrating a density log obtained in a borehole or a density profile derived from seismic inversion, or by other means).

The minimum principal stress magnitude may be found from fracture closure pressure, leakoff tests, and Eaton's or other known methods for pore pressure/fracture gradient prediction. The magnitude of the maximum horizontal stress can sometimes be determined from characteristics of wellbore failures, or other techniques.

The term "fracture closure pressure" is synonymous with minimum in-situ stress and minimum horizontal stress. One example technique includes applying increasing hydraulic pressure in a sealed-off interval to produce an axial fracture, occurring when circumferential stress produced by pressure and borehole-induced stress concentrations exceed the tensile strength of rock.

Step 510 may include estimating the minimum value of lateral tectonic strain and the maximum value of lateral tectonic strain in at least one direction corresponding to at least one principal horizontal stress of the formation. The minimum value of lateral tectonic strain and the maximum value of lateral tectonic strain may be estimated using closure pressure as estimated from stress measurements such as leak-off test (LOT), extended leak-off test (XLOT), minifrac test, step-rate-injection test (SRT), microfrac test, core strain measurement (ASR), and analysis of borehole breakouts and induced fractures from specific image logs.

The absolute horizontal stress magnitudes may be obtained from back-calculating the amount of lateral tectonic strains to reproduce the closure pressure from stress measurement. The horizontal stress magnitudes may be calculated from the following equations to get an estimate of the lateral tectonic strain (ch & EH) to match a stress measurement test:

$$\sigma_{h,min} = \frac{C_{12}}{C_{11}}(\sigma_v - \alpha P_p) + \alpha P_p + \left(C_{11} - \frac{C_{12}^2}{C_{11}}\right)\varepsilon_h + \left(C_{12} - \frac{C_{12}^2}{C_{11}}\right)\varepsilon_H$$

$$\sigma_{H,max} = \frac{C_{12}}{C_{11}}(\sigma_v - \alpha P_p) + \alpha P_p + \left(C_{11} - \frac{C_{12}^2}{C_{11}}\right)\varepsilon_H + \left(C_{12} - \frac{C_{12}^2}{C_{11}}\right)\varepsilon_H$$

The only unknowns in the equations are the lateral tectonic strains [($\varepsilon_h$—lateral tectonic strain values in the direction of $\sigma_{h,min}$; and $\varepsilon_H$—lateral tectonic strain values in the direction of $\sigma_{H,max}$). Since there are two equations with two unknowns, several iterations may be performed changing the two lateral tectonic strain values in the direction of $\sigma_{h,min}$ and $\sigma_{H,max}$, respectively, until the closure pressure from stress measurement test substantially matches. Once a good match is obtained, the minimum and maximum lateral tectonic strain values may be used to reproduce the observed closure pressure measurement.

Optional step 515 continues with obtaining acoustic measurements at a plurality of depths in a borehole intersecting the earth formation. Acoustic log data may be acquired over a range of depths in the borehole. The measurements may reflect the shear wave velocity in the earth formation as a function of depth in the wellbore. The log data may be acquired during drilling or after drilling using a wireline-conveyed device or the like. The acoustic log data may be transmitted to a processor located at the surface or downhole.

At optional step 520 the acoustic measurements may be used to estimate the minimum value of shear wave slowness of the formation and the maximum value of shear wave slowness of the formation. In conventional wireline logging using a monopole acoustic tool, the shear velocity can be measured from the shear wave refracted along the borehole wall if the formation shear wave velocity is greater than the borehole fluid acoustic velocity. In some embodiments, such as slow formations, borehole acoustic logging may be achieved by using a low frequency cross dipole mode to obtain information that is distant from the borehole. Such measurements could be obtained using a tool similar to the XMAC Elite® cross-dipole acoustic logging tool of Baker Hughes Incorporated.

Using quadrupole shear waves is also a viable technique for shear wave velocity measurement. A quadrupole acoustic tool may induce and measure the quadrupole shear wave in the formation. The low-frequency portion of the wave travels at the formation shear wave velocity, allowing for direct shear velocity measurement from the quadrupole wave.

LWD acoustic technology has been developed in recent years out of the needs for saving rig-time and for real-time applications such as geosteering and pore pressure determination, among others. LWD acoustic technology may be configured for measuring the compressional wave and shear wave velocities of an earth formation during drilling. In some instances the drill collar may generate dipole or quadrupole shear waves during operation which are sensed by transducers on the bottom hole assembly.

Step 530 includes estimating a depth-dependent lateral tectonic strain profile for the earth formation. This may be carried out by generating a linear-to-linear transformation as described above constrained to map a first value of a shear wave velocity parameter of the formation to an estimated minimum value of lateral tectonic strain in at least one direction corresponding to at least one principal horizontal stress of the formation, and map a second value of the shear wave velocity parameter of the formation to an estimated maximum value of lateral tectonic strain in the at least one direction. The first value of the shear wave velocity parameter may be a minimum value of shear wave slowness and the second value of the shear wave velocity parameter may be a maximum value of shear wave slowness. Shear wave velocity or other parameters may also be used in place of slowness. Step 530 may include mapping values in a plurality of directions corresponding to a plurality of principal horizontal stresses of the formation. The transformation may be continuous over a range of shear wave slowness values from the minimum value of shear wave slowness to the maximum value of shear wave slowness.

Step 540 may include estimating an intermediate value of lateral tectonic strain corresponding to a selected borehole depth using the depth-dependent lateral tectonic strain profile and an input value of shear wave slowness for the selected borehole depth. Step 550 may include estimating a parameter of interest of the earth formation using the depth-dependent lateral tectonic strain profile or the intermediate value. Optional step 560 may include conducting a further operation in the earth formation using the depth-dependent lateral tectonic strain profile along with other parameter of interest.

Figure 6A:
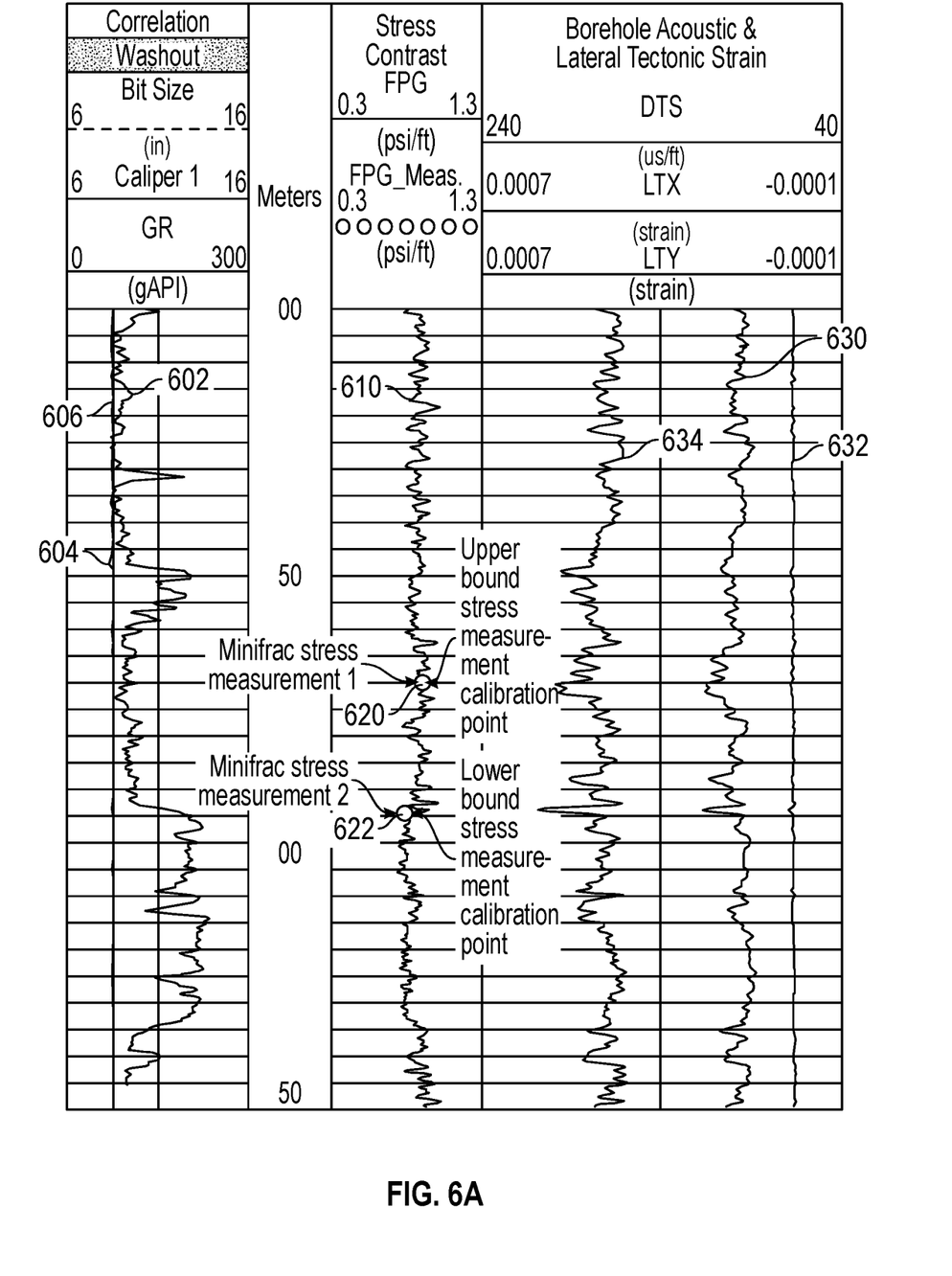
FIGS. 6A and 6B illustrate results obtained for applying a non-constant, depth-dependent lateral tectonic strain model to data from a simulated well.
Figure 6B:
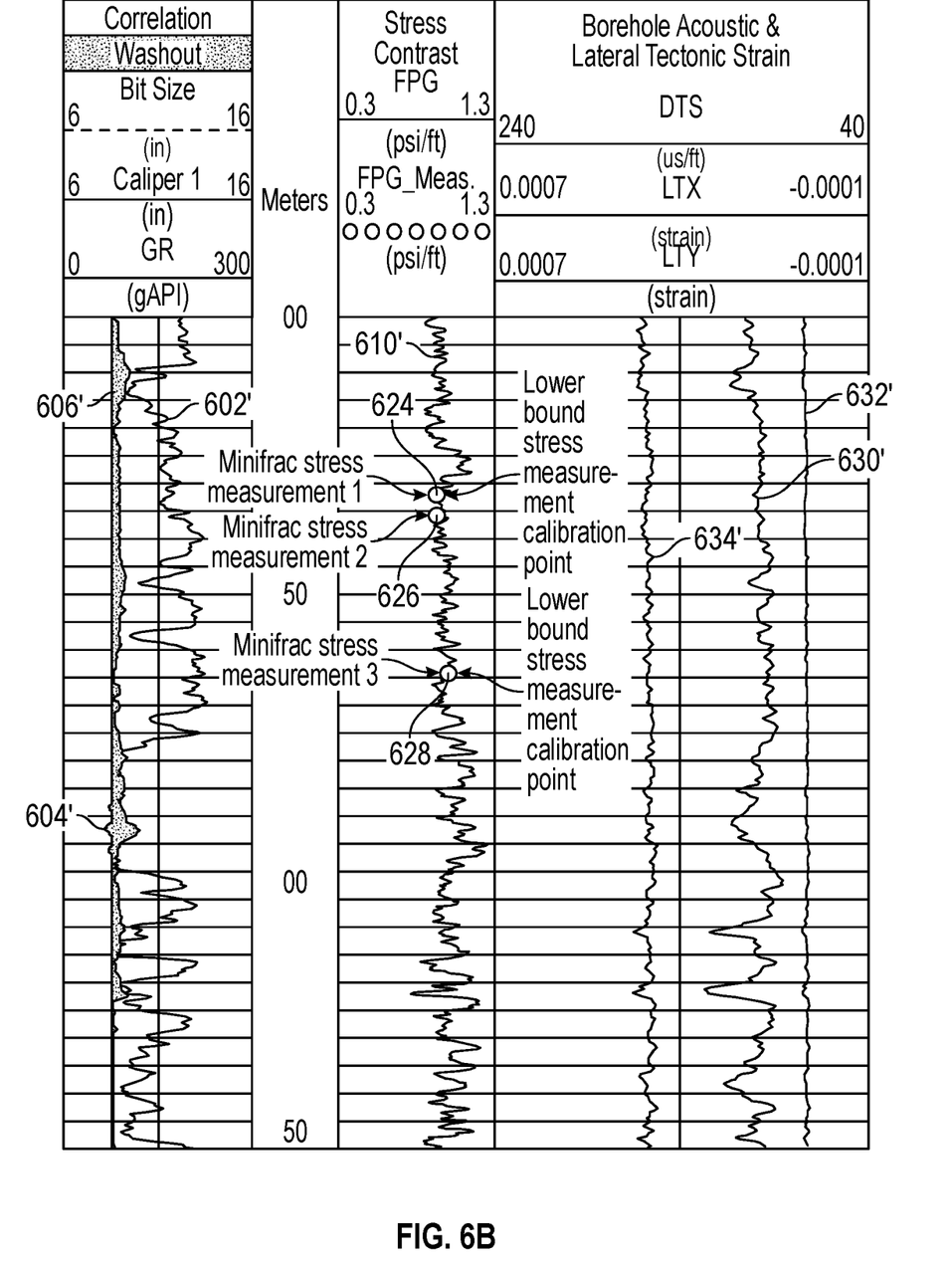

FIGS. 6A and 6B illustrate predicted results obtained for applying a non-constant, depth-dependent lateral tectonic strain model to data from test wells. The fracture gradients for one or more of the wells may be greater in the deeper section than that in shallower sections. The non-constant, depth-dependent lateral tectonic strain model allows accurate calibration from minifrac measurements, which is not possible from previous methods. The advantages of the model may be particularly evident in tight formations and formations showing pronounced anisotropy.

Track 1 of the displays includes gamma ray 602, 602', borehole caliper 604, 604', and bit size 606, 606' curves. The curve in the second track is the fracture pressure gradient 610, 610', or the pressure that is required to induce fracture in the rock formation at any given depth; the calibration points are the formation breakdown pressures (620-628) from the minifrac testing data, which represent the pressure at which the minifrac will cause the rock formation to fracture hydraulically. The next two tracks show borehole acoustic measurements for shear waves 630 and lateral tectonic strains for the x-direction (LTX 632) and y-direction (LTY 634), respectively.

The results may be obtained by selecting lower bound (minimum) and upper bound (maximum) values of stress measurement at different depths, and applying lateral tectonic strain modeling iteration in the minimum and maximum stress direction until each of the two points in the stress measurement is matched. Minimum (EL2) and maximum (ER2) lateral tectonic strain values to match the two stress measurement points may be recorded. Four values may be obtained. Using the DTS curve, the minimum (EL1) and maximum (ER1) value of the shear wave slowness may be obtained. A linear transformation to DTS curve may be applied to obtain a continuous lateral tectonic strain curve. Lateral tectonic strain modeling may be applied in the minimum and maximum stress direction using the LTX and LTY curves to calibrate a model. Lateral tectonic strain curves may be generated in the direction of the minimum horizontal stress (LTX) and the maximum horizontal stress (LTY).

In some embodiments stored data may be used in estimating parameters of interest. These data may be obtained by, for example, retrieving previously acquired data from a data repository, from local memory, or from other associated storage, or may be carried out by retrieving previously calculated or estimated parameters from such storage. In some embodiments, the data may be acquired at the same time as the acquisition of limited aperture log data, while in other instances data may be acquired in separate periods. As one practical example, cross-dipole logs taken in connection with previous operations may be used as a source of data for some of the processes described herein.

In some embodiments, estimating constraints may include using knowledge of the wellbore orientation and/or relationships between far-field stress magnitudes and orientations and the orientations and magnitudes of stresses near a wellbore. In other embodiments, constraints may be estimated for relationships between two or more stress properties.

Methods embodiments may include conducting further operations in the earth formation in dependence upon the estimated parameter or upon models created using the estimated parameter. Further operations may include at least one of: i) extending the borehole; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) evaluating the formation; and x) producing one or more hydrocarbons from the formation.

Fracturing operations may be carried out to initiate hydrocarbon production or for purposes of well evaluation. Such operations may use example stimulation embodiments as discussed below. Hydraulic fracture may be produced in the formation by injection of a fracturing fluid in an injection borehole. Predicting propagation of the hydraulic fracture may be carried out using constraint analysis as described below.

The pressure required to initiate the fracture is a function of the magnitudes of the principal stresses, as well known in the art and embodied in "Compressive and tensile failure of inclined wellbores and determination of in-situ stress and rock strength" by Peska and Zoback (Peska, P., Zoback, M.D. Compressive and tensile failure of inclined wellbores and determination of in-situ stress and rock strength. J Geophys Res-Solid Earth 1995; 100:12791-811). The pressure required to extend the fracture away from the wellbore is controlled by the minimum horizontal stress. In another technique, the minimum horizontal stress is approximated with instantaneous shut-in pressure of a hydraulic fracture after pumping is ceased.

Propagation of the hydraulic fracture may be predicted by modeling the earth formation (e.g., using a three-dimensional geomechanical model) and using parameters of the principal stresses as an input. Stresses acting on the formation and fracture flow properties may be incorporated into a time-based (e.g., incremental) flow simulation. Alternatively, propagation may be predicted using a special purpose-built heuristic, using a neural network (with the principal direction of the far-field stress as one of the inputs), and so on. The predicted fracture may then be used alone or as part of a larger simulation (e.g., as a constraint) in planning further operations associated with the borehole or the formation. In some aspects, the hydraulic fracture may be predicted.

Predicting the propagation of the hydraulic fracture enables optimization of the fracture, along with optimization and project planning of other related future operations in the borehole, the formation, or related formations. Accurate propagation prediction enables proper orientation of horizontal laterals to minimize breakdown pressure, maximize fracture connectivity in the near-wellbore, and create an ideal geometry for maximum coverage of the intervals between wells by the hydraulic fracture and accompanying stimulated rock volume.

Figure 7:
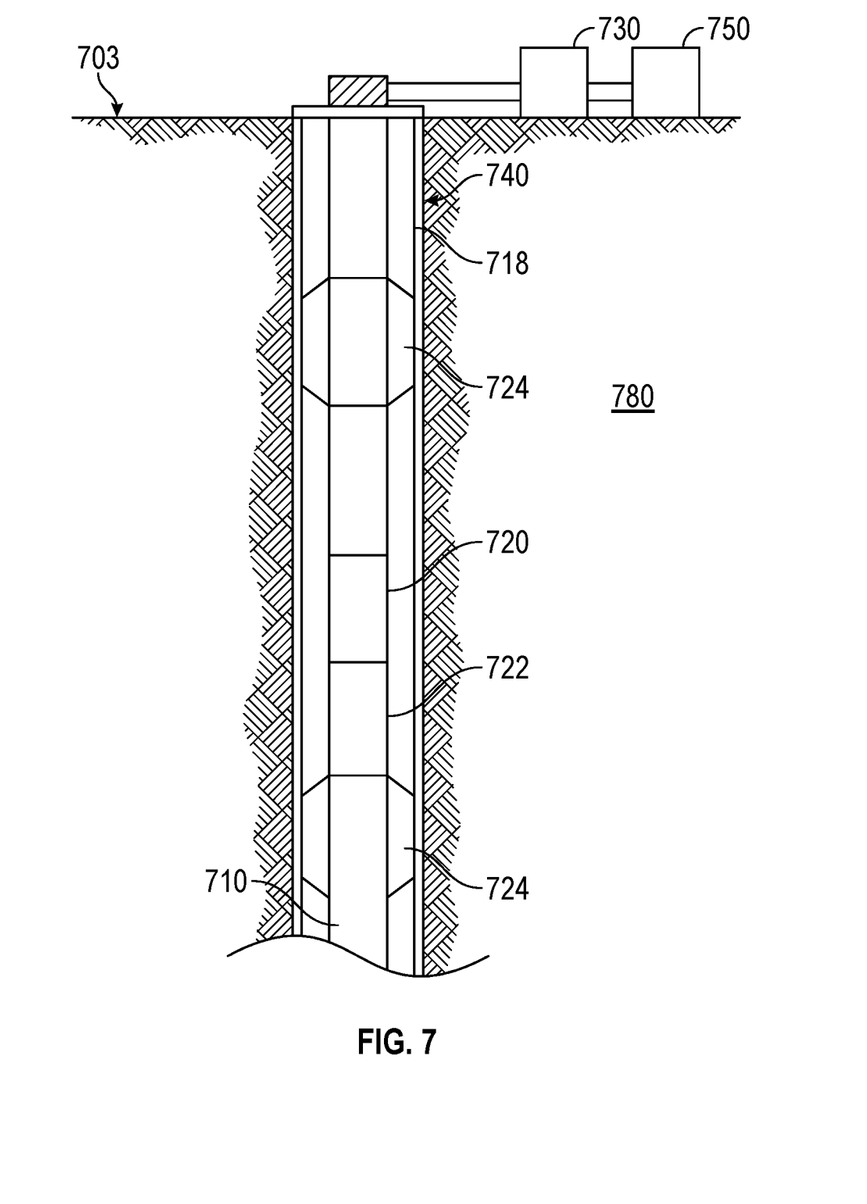
FIG. 7 illustrates a stimulation system in accordance with embodiments of the present disclosure.

FIG. 7 illustrates a stimulation system in accordance with embodiments of the present disclosure. The system 703 includes a downhole tool string 710, such as a stimulation string, wireline, or other carrier conveyed in a borehole 740 surrounded by casing 718. In one embodiment, the system 703 is configured as a hydraulic stimulation system, but may also configured for additional functions such as hydrocarbon production, evaluation of the formation, evaluation of the borehole, and so on. As described herein, "stimulation" may include any injection of a fluid into a formation. An exemplary stimulation system may be configured as a cased or open hole system for initiating fractures and/or stimulating existing fractures in the formation. A fluid may be any flowable substance.

The tool string 710 may include one or more tools or components to facilitate stimulation of the formation 780. For example, the tool string 710 may include a fracturing assembly 720 including, e.g., injection nozzles and mechanical valve devices (e.g., fracturing sleeves, drop-ball devices, and so on). The tool string 710 may include a perforation assembly 722. The tool string 710 may include additional components, such as one or more isolation components 724 (e.g., packer subs, frangible barriers, etc.). Subs may include one or more processors or associated electronics configured to communicate with a surface processing unit and/or control the respective component or assembly. The system 703 may be a hydraulic fracturing system that includes an injection device 730 (e.g., a high pressure pump) in fluid communication with a fluid source 750. The injection device 730 injects fluid into the string 710 to introduce fluid into the formation 780. Measurement and control devices, including one or more sensors responsive to pumping parameters, may be included for monitoring and control of the respective operation (e.g., hydraulic fracturing or other stimulation).

As used above, an information processing device is any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals.

The term "carrier" as used above means any device, device component, combination of devices, media and/or member that may be used to convey, house, support, or otherwise facilitate the use of another device, device component, combination of devices, media and/or member. Exemplary non-limiting carriers include drill strings of the coiled tube type, of the jointed pipe type, and any combination or portion thereof. Other carrier examples include casing pipes, wirelines, wireline sondes, slickline sondes, drop shots, downhole subs, bottom hole assemblies, drill string inserts, modules, internal housings, and substrate portions thereof.

The tool 110 may also include sensors, tools, or instruments configured to: (i) actively or passively collect information about the various characteristics of the formation, (ii) provide information about tool orientation and direction of movement, (iii) provide information about the characteristics of the reservoir fluid and/or (iv) evaluate reservoir conditions (e.g., formation pressure, wellbore pressure, temperature, etc.). Exemplary devices may include resistivity sensors (for determining the formation resistivity, dielectric constant and the presence or absence of hydrocarbons), acoustic sensors (for determining the acoustic porosity of the formation and the bed boundary in the formation), nuclear sensors (for determining the formation density, nuclear porosity and certain rock characteristics), and nuclear magnetic resonance sensors (for determining the porosity and other petrophysical characteristics of the formation). Other exemplary devices may include gyroscopes, magnetometers, and sensors that collect formation fluid samples and determine the characteristics of the formation fluid, which include physical characteristics and chemical characteristics.

In some embodiments, the borehole may be utilized to recover hydrocarbons. In other embodiments, the borehole may be used for geothermal applications, water production, mining, tunnel construction, or other uses.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

Measurements of sonic travel time, or "slowness," are well known, and may be considered as depending upon the properties inherent in Snell's Law to propagate sound from a transmitter to a receiver through an earth formation. Slowness is the inverse of the sound velocity. The measurement is representative of travel time of sound through the formation. Typically the term refers to measurements wherein the transmitter and receiver are in a borehole intersecting the formation, e.g., on a tool string in the borehole. The speed of sound in the earth formation is governed in approximation by the physical properties embodied in the Wood-Biot-Gassmann equations.

"Closure pressure" as used herein refers to a parameter used in hydraulic fracture design to indicate the pressure at which the fracture effectively closes without proppant in place. "Profile" as used herein refers to a model.

"Linear-to-linear" transformation, as used herein, refers to transformations using linear functions. "Linear" function, as used herein, may refer to a function having the form $f(x)=Ax+B.$ Parameters of interest may include lateral tectonic strain, minimum horizontal stress, and so on.

The estimated parameter of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements made in wireline or MWD applications may be done by a surface processor, by a downhole processor, or at a remote location. The data acquisition may be controlled at least in part by the downhole electronics. Implicit in the control and processing of the data is the use of a computer program on a suitable non-transitory machine readable-medium that enables the processors to perform the control and processing. The non-transitory machine-readable medium may include ROMs, EPROMs, EEPROMs, flash memories and optical disks. The term processor is intended to include devices such as a field programmable gate array (FPGA).

While the foregoing disclosure is directed to specific embodiments of the present disclosure, various modifications will be apparent to those skilled in the art. It is intended that all variations within the scope of the appended claims be embraced by the foregoing disclosure.

What is claimed is:

1. A method of developing an earth formation by performing at least one of i) drilling a borehole in the earth formation; ii) hydraulically stimulating the earth formation; and iii) performing a completion of a well in the earth formation, the method comprising:
    estimating a depth-dependent lateral tectonic strain profile by generating a linear-to-linear transformation constrained to:
    i) map a first value of a shear wave slowness of the formation to an estimated minimum value of lateral tectonic strain in at least one direction corresponding to at least one principal horizontal stress of the formation, and
    ii) map a second value of the shear wave slowness of the formation to an estimated maximum value of lateral tectonic strain in the at least one direction; and
    performing an action with respect to an operation in the earth formation, the action comprising at least one of:
    i) steering a drillbit in the earth formation in dependence upon the depth-dependent lateral tectonic strain profile; ii) hydraulically stimulating the earth formation in dependence upon the depth-dependent lateral tectonic strain profile; iii) modifying a mud program with respect to the borehole in the earth formation in dependence upon the depth-dependent lateral tectonic strain profile; iv) optimizing a drilling parameter in dependence upon the depth-dependent lateral tectonic strain profile; v) optimizing a fracture of the earth formation in dependence upon the depth-dependent lateral tectonic strain profile; vi) performing a completion of a well in the earth formation in dependence upon the depth-dependent lateral tectonic strain profile.

2. The method of claim 1 wherein the first value of the shear wave slowness is a minimum value of shear wave slowness and the second value of the shear wave slowness is a maximum value of shear wave slowness.

3. The method of claim 2 wherein the linear-to-linear transformation is constrained to map the minimum value of shear wave slowness to estimated minimum values of lateral tectonic strain in a plurality of directions corresponding to a plurality of principal horizontal stresses of the formation, and
    map the maximum value of shear wave slowness to estimated maximum values of lateral tectonic strain in the plurality of directions.

4. The method of claim 2 wherein the transformation is continuous over a range of shear wave slowness values from the minimum value of shear wave slowness to the maximum value of shear wave slowness.

5. The method of claim 1 comprising estimating the minimum value of lateral tectonic strain and the maximum value of lateral tectonic strain using closure pressure.

6. The method of claim 1 comprising:
    obtaining acoustic measurements at a plurality of depths in a borehole intersecting the earth formation;
    using the acoustic measurements to estimate the first value and the second value.

7. The method of claim 1 comprising estimating an intermediate value of lateral tectonic strain corresponding to a selected borehole depth using the depth-dependent lateral tectonic strain profile and an input value of shear wave slowness for the selected borehole depth.

8. The method of claim 1 comprising estimating the minimum value of lateral tectonic strain and the maximum value of lateral tectonic strain.

9. The method of claim 1 comprising estimating at least one other parameter of interest of the earth formation using the depth-dependent lateral tectonic strain profile.

10. The method of claim 1 comprising conducting a further operation in the earth formation using the depth-dependent lateral tectonic strain profile.

11. An apparatus for developing an earth formation by performing at least one of i) drilling a borehole in the earth formation; ii) hydraulically stimulating the earth formation; and iii) performing a completion of a well in the earth formation, including estimating a property of an earth formation having associated principal horizontal stresses, the apparatus comprising:
    a logging tool configured to obtain acoustic measurements indicative of a shear wave velocity parameter of the formation at a plurality of depths in a borehole intersecting the formation; and
    at least one processor configured to:
    estimate a first value of a shear wave slowness of the formation at a first depth and a second value of the shear wave slowness at a second depth using the acoustic measurements, wherein the first value of the shear wave slowness is a minimum value of shear wave slowness and the second value of the shear wave slowness is a maximum value of shear wave slowness;
    estimate a depth-dependent lateral tectonic strain profile for the earth formation by generating a linear-to-linear transformation constrained to:

i) map the first value to an estimated minimum value of lateral tectonic Response to Final Office Action strain in at least one direction corresponding to at least one principal horizontal stress of the formation, and ii) map the second value to an estimated maximum value of lateral tectonic strain in the at least one direction; and at least one of: i) a drilling system configured to steer a drillbit of the drilling system in the earth formation in dependence upon the depth-dependent lateral tectonic strain profile; ii) a drilling system configured to modify a mud program in dependence upon the depth-dependent lateral tectonic strain profile; iii) a hydraulic stimulation system configured to stimulate the earth formation in dependence upon the depth-dependent lateral tectonic strain profile.

12. The apparatus of claim 11 wherein the linear-to-linear transformation is constrained to map the minimum value of shear wave slowness to estimated minimum values of lateral tectonic strain in a plurality of directions corresponding to a plurality of principal horizontal stresses of the formation, and map the maximum value of shear wave slowness to estimated maximum values of lateral tectonic strain in the plurality of directions.

13. The apparatus of claim 11 wherein the transformation is continuous over a range of shear wave slowness values from the minimum value of shear wave slowness to the maximum value of shear wave slowness.

14. The apparatus of claim 11 comprising estimating the minimum value of lateral tectonic strain and the maximum value of lateral tectonic strain using closure pressure.

15. The apparatus of claim 1 comprising estimating a parameter of interest of the earth formation using the depth-dependent lateral tectonic strain profile.

16. A method of producing hydrocarbons from an earth formation, the method comprising:
employing a depth-dependent lateral tectonic strain profile created using the method of claim 1 to perform further operations in the formation.

17. The method of claim 16 further comprising using the depth-dependent lateral tectonic strain profile to estimate at least one principle stress of the formation.

18. An apparatus for estimating an in situ stress of an earth formation having associated principal horizontal stresses, the apparatus comprising:
a logging tool configured to obtain acoustic measurements indicative of a shear wave velocity parameter of the formation at a plurality of depths in a borehole intersecting the formation; and
at least one processor configured to:
estimate a first value of a shear wave slowness of the formation at a first depth and a second value of the shear wave slowness at a second depth using the acoustic measurements;
generate a model of the earth formation comprising a depth-dependent lateral tectonic strain profile stored as information in at least one non-transitory machine-readable medium, including:
estimating the depth-dependent lateral tectonic strain profile for the earth formation by generating a linear-to-linear transformation constrained to:
i) map the first value to an estimated minimum value of lateral tectonic strain in at least one direction corresponding to at least one principal horizontal stress of the formation, and
ii) map the second value to an estimated maximum value of lateral tectonic strain in the at least one direction; and
estimate the in situ stress using the model; and
at least one of: i) a drilling system configured to steer a drillbit of the drilling system in the earth formation in dependence upon the estimated in situ stress; ii) a drilling system configured to modify a mud program in dependence upon the estimated in situ stress; iii) a hydraulic stimulation system configured to stimulate the earth formation in dependence upon the estimated in situ stress.

* * * * *